Aug. 23, 1960     L. B. BROWDER     2,950,160
STRING GALVANOMETER OSCILLOGRAPH APPARATUS
Filed Oct. 8, 1954     2 Sheets-Sheet 1
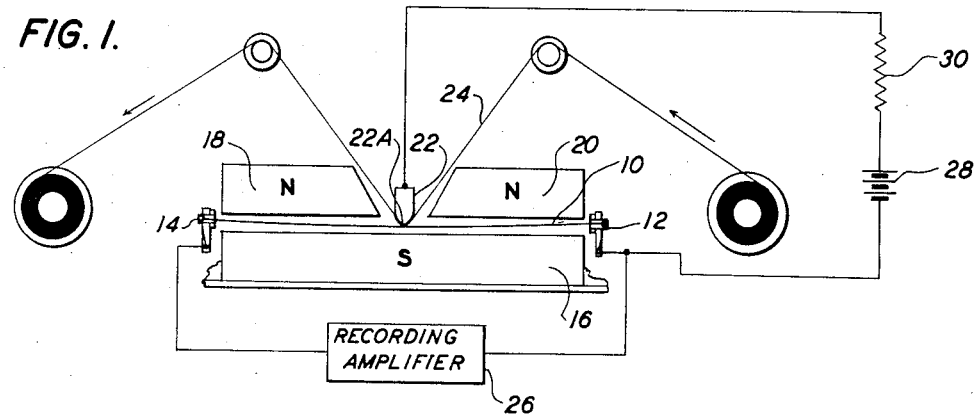
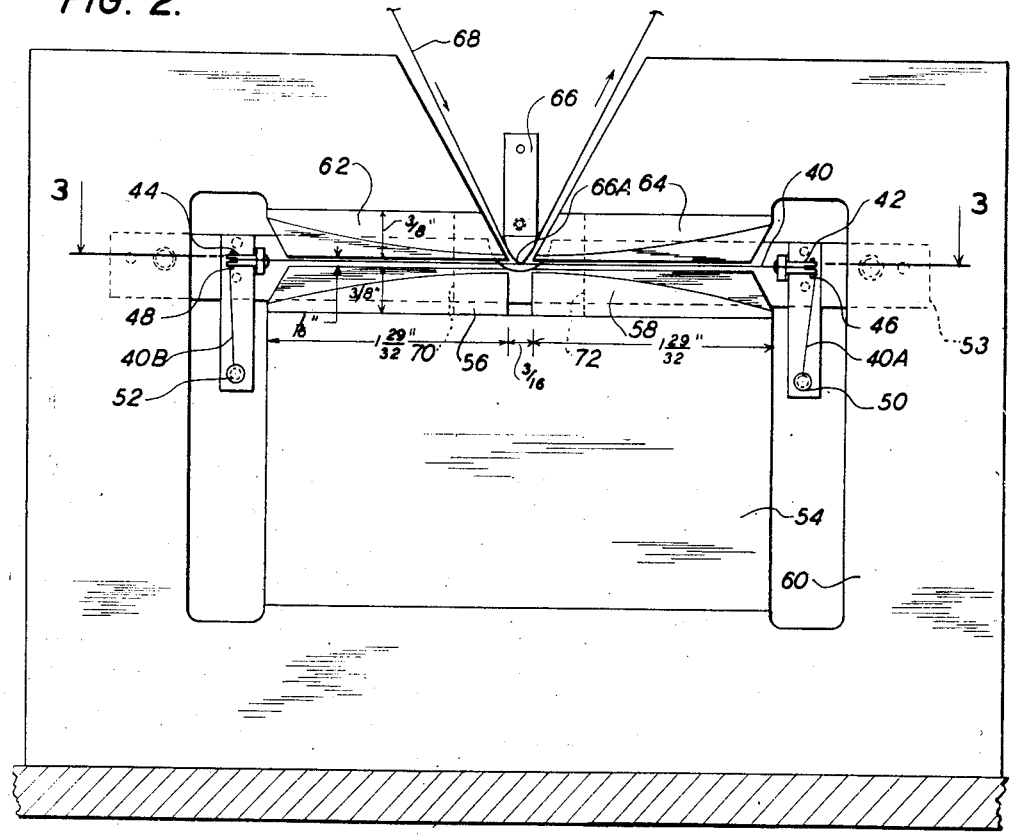
INVENTOR.
LEWIS B. BROWDER
BY
Christie, Parker & Hale
ATTORNEYS Aug. 23, 1960     L. B. BROWDER     2,950,160
STRING GALVANOMETER OSCILLOGRAPH APPARATUS
Filed Oct. 8, 1954     2 Sheets-Sheet 2

INVENTOR.
LEWIS B. BROWDER
BY
*Christie, Parker & Hale*
ATTORNEYS

United States Patent Office 2,950,160
Patented Aug. 23, 1960

2,950,160

STRING GALVANOMETER OSCILLOGRAPH APPARATUS

Lewis B. Browder, La Canada, Calif., assignor, by mesne assignments, to Bell & Howell Company, Chicago, Ill., a corporation of Illinois Filed Oct. 8, 1954, Ser. No. 461,088

5 Claims. (Cl. 346—74)

This invention relates to improvements in string galvanometers, and it has particular reference to a string galvanometer for recording an oscillographic trace directly upon a recording medium such as current-sensitive paper.

Direct writing oscillographs usually require a recording element which is capable of large amplitudes of motion throughout a specified frequency range in order to provide a satisfactory oscillograph record.

Ordinarily, D'Arsonval type motors are provided with an elongated arm to magnify the motion so as to obtain sufficiently large amplitudes for a direct writing oscillograph. The elongated arm is provided with an inking pen or some other suitable marking stylus for making a record on a recording medium. In such an arrangement, the mass which is moved is large and the dynamics of the system make it impractical to record signals having a frequency above 100 cycles per second. Also, the movable arm arrangement provides a curvilinear oscillographic trace which is more difficult to interpret than a conventional rectilinear trace.

Signals having frequencies above 100 cycles per second usually are recorded by means of a photographic type instrument in which the necessary magnification of motion is obtained by optical means. Such arrangements require processing of the medium upon which the oscillographic trace is recorded and hence are not suitable for use when it is necessary to inspect the trace immediately after it is recorded.

These difficulties are overcome in the present invention by employing a large-amplitude string galvanometer as the writing element. The string is a flexible conductor, and it is supported by springs at its two ends so that the central portion of the string can be deflected transversely a large distance in either direction in order to provide the large amplitudes of motion which are required for recording directly.

Such a galvanometer is capable of directly recording large amplitude traces over a wide frequency range. By way of example, it is capable of recording a one inch peak-to-peak amplitude trace at frequencies up to 250 cycles per second, or at even higher frequencies.

The conductive string element is located in a magnetic field with the string extending perpendicularly with respect to the direction of the magnetic field, so that the string moves transversely with respect to the magnetic flux in accordance with the magnitude of the electric current which flows through it.

As the string is deflected in either direction, the springs which support the string permit the end supports for the string to move closer together. However, the spring supporting system does not maintain the tension on the string exactly constant, and the tension on the string increases in accordance with the amount of deflection of the string. The deflection of the string is directly proportional to the current which flows through it and inversely proportional to the tension on it. Hence, variations in the tension affect the linearity of the galvanometer.

Preferably, the pole pieces which provide the magnetic field are provided with recessed or cut out areas arranged so that the length of the conductive string upon which the magnetic field operates increases as the central portion of the string is deflected in either direction, so as to compensate for variations in the tension in the string and provide a substantially linear current-deflection response. This feature of the galvanometer is covered in application Serial Number 461,086, filed on October 8, 1954 by Clifford E. Berry.

The spring supports for the string are leaf springs which provide resilient support along the direction of the string and which restrain movement of the ends of the string in all other directions.

Preferably, a pair of pins are affixed to the ends of the respective leaf springs and the string is looped around the respective pins in a loose fit, with the string extending beyond the pins at each end to provide pigtail connections for coupling the conductive string to a signal source. With such an arrangement, the string is not adversely affected by the action of the springs, and the electrical connection to the conductive string is not affected by movement of the spring supports, since the pigtail portions are extensions of the string element. This feature of the galvanometer is covered in application Serial Number 461,087, filed on October 8, 1954 by Clifford E. Berry.

I prefer to employ a current-sensitive paper as the recording medium. However, other media such as pressure-sensitive or heat-sensitive paper may be employed. Also, the string element of the galvanometer may be employed to interrupt a light beam in a photographic recording system.

For direct writing on current-sensitive paper, an anvil in the form of a conductive electrode having an edge located at the central portion of the string element is employed to guide the recording paper adjacent the writing element. The edge of the anvil is disposed perpendicularly with respect to the string element, and the current-sensitive paper is moved over the edge of the anvil so that it passes between the anvil and the string element of the galvanometer. A source of current is coupled between the anvil and the string so that an electric current passes through the paper at the intersection of the string and the line formed where the recording paper passes over the edge of the anvil. Thus, a trace is formed which provides an indication of the deflections of the string element of the galvanometer.

The invention is explained in more detail with reference to the drawings, in which:

Fig. 1 is a simplified disclosure of the recording apparatus;

Fig. 2 is an elevation view of one embodiment of the invention;

Figure 3:
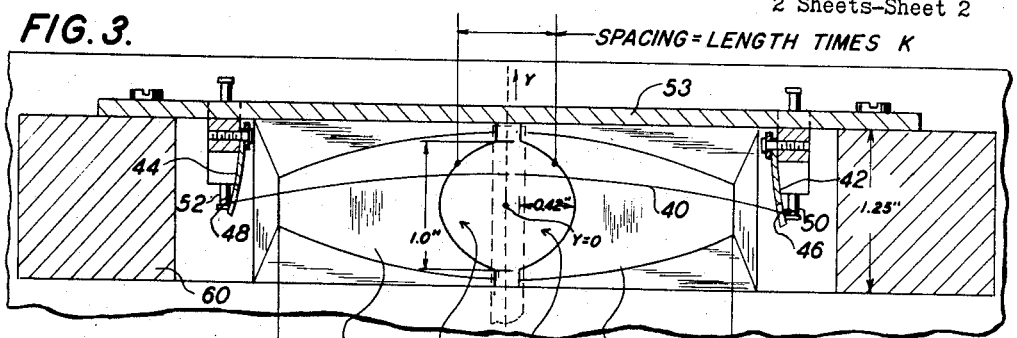
Fig. 3 is a sectional view along line 3—3 of Fig. 2.

With reference to Fig. 1, the string element of the galvanometer comprises a flexible conductor 10 which is supported at its ends by a pair of springs 12 and 14. The springs are arranged to provide resilient support for the string element along the direction of the string, and they serve to restrain movement in all other directions, so that the deflection of the string is not adversely affected by the end supports.

The springs should have a low spring rate so as to insure constant incremental sensitivity with amplitude, their effective mass should be low so that it does not affect the string dynamics in a way which would require an undesirable increase in driving power, and its natural period should be high enough to insure that it follows the string excursions and that there is no tendency for periodic interchange of energy between the string and the springs.

A magnetic pole piece 16 and a pair of members 18 and 20 forming the other pile piece are located on opposite sides of the string element, and they provide a magnetic field which is disposed perpendicularly with respect to the length of the string element. The upper pole piece is in two parts so as to permit a recording medium to pass between them and adjacent the string element of the galvanometer.

A conductive guide or anvil 22 is located in the space between the two upper pole pieces. The anvil has an edge which extends perpendicularly with respect to the string element, and a current-sensitive recording paper 24 moves over this edge of the anvil so that it extends between the conductive anvil and the string element of the galvanometer in the plane of motion of the string.

The ends of the string element are connected to a signal source such as a recording amplifier 26. The electric current which flows through the string element causes its central portion to be deflected in accordance with the magnitude of the signals provided by the signal source. Co-pending application Serial Number 445,518, which was filed on July 26, 1954 by Norton W. Bell, discloses one suitable recording amplifier.

A source of electric current 28 has one terminal connected to the string element of the galvanometer and it has the other terminal connected through a current limiting resistor 30 to the conductive anvil. Thus, current flows through the current-sensitive recording paper at the intersection between the string element and the line formed by the edge of the conductive anvil. Hence, the electric current which flows between the string element and the conductive anvil causes a trace to be recorded on the current-sensitive recording paper in accordance with the movements of the string element.

Figs. 2 to 6 show the details of one version of the recording apparatus which is capable of recording traces having one inch peak-to-peak amplitude up to a frequency of 250 cycles per second with good linearity.

Figures 4, 5:
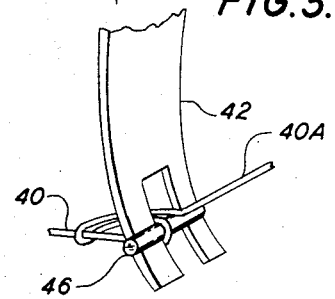
Fig. 4 is a perspective view of one of the spring supports.
Fig. 5 shows how the string element of the galvanometer may be attached to the spring support.
Figure 6:
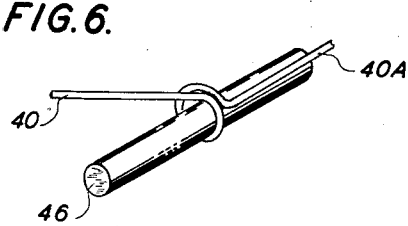
Fig. 6 shows an alternative arrangement for attaching the string element of the galvanometer to the pin which is carried by the spring support.

As before, the string element is a flexible conductor 40 which is supported by a pair of leaf springs 42 and 44. The outer ends of the leaf springs are notched, and cylindrical-shaped pins 46 and 48 are affixed to the notched ends of the springs. The string element is looped around the respective pins in a loose fit, as illustrated in Fig. 5 or in Fig. 6, and the ends of the string element extend approximately perpendicularly with respect to the direction of movement of the strings to form a pair of pigtails 40A and 40B which are connected to a pair of terminals 50 and 52 for coupling the string to a signal source. The terminals 50 and 52 and the springs 42 and 44 are mounted on a rigid base 53 which is affixed to the magnet yoke. The springs and the terminals are insulated from the rest of the structure.

With such an arrangement the pigtail end portions 40A and 40B are subjected primarily to torsional stresses only and hence have a long life. The pigtails provide a reliable electrical connection to the string, yet they exert negligible forces upon the string itself.

Preferably, the leaf springs are mounted to extend along a direction which is perpendicular to both the direction of the magnetic field and the direction along which the string extends, as shown in Figs. 2 and 3. With such an arrangement, the leaf springs provide resilient support along the direction of the string and restrain movement of ends of the string in all other directions. Also, flexure of the springs does not displace the string from its central location between the two pole pieces, and hence the pressure of the string on the recording paper does not change as the string is deflected transversely.

The magnetic field for the string element is provided by a magnet 54 having one pole piece which comprises a pair of members 56 and 58, and having a yoke 60 interconnecting the other pole of the magnet and another pole piece comprising a pair of members 62 and 64.

A conductive anvil 66 is located between the members 62 and 64 of the upper pole piece, and it is provided with an edge 66A which extends perpendicularly with respect to the length of the string element. A suitable recording medium 68 is passed over the edge of the conductive anvil between the anvil and the string element of the galvanometer, so that the recording medium is located approximately in the plane of movement of the string.

Fig. 3 illustrates the deflection of the string from its central location between the two pole pieces. The deflection of the center of the string element is directly proportional to the magnetic field strength and to the electric current which flows through the string element of the galvanometer, and it is inversely proportional to the tension in the string element. The spring supports 42 and 44 are resilient along the direction along which the string extends, but the tension on the string increases when it is deflected from its central location. This increase in tension on the string element causes non-linearity in the current-deflection response of the galvanometer. This may be corrected by providing recessed or cut out areas in the central portions of the pole pieces so that the length of the string upon which the magnetic field operates increases as the central portion of the string is deflected in either direction. One suitable arrangement is illustrated in Fig. 3 wherein the adjacent ends of the two members forming one pole piece have cut out areas 70 and 72 of parabolic shape. With such an arrangement the other pole piece should have a cut out area which corresponds to that of the pole piece shown on Fig. 3.

The shape of the cut out areas 70 and 72 is defined to the first order by the formula $$K = K_0 - CY^2(0.55 - K_0)$$

where K times the length of the pole piece of the magnet equals the spacing between the edges of the opposed parabolas for any selected value of Y, $K_0$ is the value of K at the center of the pole piece where Y equals zero, C is the non-linearity coefficient which can be determined experimentally and Y is the lateral distance in either direction from the center of the pole piece. Setting the spacing between the edges of the opposed parabolas to be 0.188 inch when Y is 0.5 inch, setting the length of the pole piece to be 3.5 inches, and assuming that $C = 2.48$ (which was determined experimentally for the apparatus of Figs. 2 and 3), then where Y is 0.5, $$K = \frac{.188}{3.50} = .0537$$

Using this value for K in the formula given above, it will be found that $K_0 = .244$ for these parameters. Then the formula which defines the shape of the cut out areas for these parameters is $$K = .244 - .76Y^2$$

The non-linearity coefficient C is the coefficient in the expression $$T = T_0(1 + CY^2)$$

where T is the tension on the string, $T_0$ is the tension on the string when it is not deflected, and Y is the lateral displacement of the central portion of the string.

The coefficient C can be determined experimentally from current-deflection measurements conducted with magnet pole pieces which are not cut out to correct for the non-linearity, by ascertaining its value in the following equation $$I = Y(1 + CY^2)$$

The above equations do not take into account the fringing effects of the magnetic field in the cut out areas, and hence the cut out areas should be slightly larger than calculations indicate in order to obtain the best linearity.

Typical dimensions are shown on the apparatus of Figs. 2, 3 and 4 for a recording arrangement wherein the magnetic field is 16,000 gauss. The pole pieces are made of cold-rolled steel, the spring supports of beryllium copper (Berylco 25 alloy), which is formed in the shape indicated in Fig. 4 and then age-hardened for two hours at 600° F., and the string element is composed of beryllium copper having a diameter of .0063 inch. The tension on the string element was adjusted to approximately 50 grams to provide a resonant frequency of 200 cycles per second.

It will be apparent that the dimensions and the materials which are disclosed herein are merely illustrative and that various other arrangements may be employed if desired.

I claim:

1. An oscillograph comprising means for producing a magnetic field, a flexible conductor, means for resiliently supporting the ends of the flexible conductor to permit the ends of the flexible conductor to move closer together when the center of the flexible conductor is transversely displaced with relatively little increase in the tension on the resilient conductor, said means normally positioning the flexible conductor in the magnetic field, a conductive anvil having a straight ridge located adjacent and extending perpendicularly with respect to the flexible conductor, current-sensitive paper located between the anvil and the flexible conductor and in contact with the anvil along the ridge, a source of electric current coupled between the anvil and the flexible conductor for causing electric current to pass through the current-sensitive paper, and means coupling the ends of the flexible conductor to a source of electric signals for causing the flexible conductor to move across the current-sensitive paper in accordance with the magnitude of the electric current which passes through the flexible conductor.

2. An oscillograph comprising means for producing a magnetic field, an elongated conductor, a pair of leaf springs located at and secured to the ends of the conductor and supporting it in the magnetic field with the conductor extending perpendicularly with respect to the direction of the magnetic field, the leaf springs extending along a direction which is perpendicular to both the direction of the elongated conductor and the direction of the magnetic field so that the springs provide resilient support along the direction of the elongated conductor and restrain movement of the ends of the conductor in all other directions, with the springs providing support that yields in response to transverse movement of the elongated conductor to permit large amplitudes of transverse movement of the elongated conductor without deforming it, a conductive anvil having a straight ridge located adjacent the center of the conductor and extending perpendicularly with respect to the elongated conductor, current-sensitive paper located between the anvil and the elongated conductor, means for moving the sensitive paper across the ridge of the anvil, a source of electric current coupled between the anvil and the elongated conductor for causing electric current to pass through the current-sensitive paper as it moves across the ridge of the anvil, and means for coupling the ends of the elongated conductor to a source of electric signals for causing the elongated conductor to move across the current-sensitive paper in accordance with the signals which are applied to the elongated conductor.

3. An oscillograph comprising a pair of opposed pole pieces for producing a magnetic field, a flexible conductor located between the pole pieces, resilient means located adjacent the ends of the conductor for supporting it in a central location between the pole pieces, one of the pole pieces comprising two members located end to end with a space between them, a guide member forming a ridge located in the space between said two members of the pole piece adjacent the central portion of the flexible conductor and extending perpendicularly with respect to the flexible conductor, a recording medium, means for moving the recording medium across the ridge of the guide member, and means for producing a visual indication on the recording medium of the transverse movement of the flexible conductor across the recording medium as it passes over the ridge of the guide member for providing a record of the movements of the flexible conductor.

4. An oscillograph comprising a pair of opposed pole pieces for producing a magnetic field, a flexible conductor located between the pole pieces, a pair of springs secured to the ends of the conductor, means rigidly supporting the springs in relation to the pole pieces, the springs supporting the flexible conductor in a central location between the pole pieces and for providing resilient support along the direction of the flexible conductor to permit large amplitudes of transverse movement of the central portion of the flexible conductor, one of the pole pieces comprising two members located end to end with a space between them, a conductive anvil located in the space between said two members of the pole piece having a ridge adjacent the flexible conductor and extending perpendicularly with respect to the flexible conductor, current-sensitive paper, means for passing the sensitive paper across the ridge between the anvil and the flexible conductor, means for coupling a source of electric current between the anvil and the flexible conductor for causing electric current to pass through the current-sensitive paper, and means for coupling the ends of the flexible conductor to a source of electric signals to cause the flexible conductor to move across the current-sensitive paper in accordance with the magnitude of the electric current which passes through the flexible conductor.

5. An oscillograph comprising means for producing a magnetic field, a flexible conductor, means for resiliently supporting the ends of the flexible conductor to permit the ends of the flexible conductor to move closer together when the center of the flexible conductor is transversely displaced with relatively little increase in the tension on the resilient conductor, said means normally positioning the flexible conductor in the magnetic field, an anvil having a ridge located adjacent and extending perpendicularly with respect to the flexible conductor, a recording medium, means for moving the recording medium across the ridge, the medium crossing the ridge between the anvil and the flexible conductor, means coupling the ends of the flexible conductor to a source of electric signals for causing the flexible conductor to move across the surface of the recording medium in accordance with the magnitude of the electric current which passes through the flexible conductor, and means for sensitizing the recording medium to produce an indication at the point where the flexible conductor passes across the ridge of the anvil.

References Cited in the file of this patent

UNITED STATES PATENTS

| | | |
|---|---|---|
| 1,820,088 | Parker et al. | Aug. 25, 1931 |
| 1,855,669 | Glasser et al. | Apr. 26, 1932 |
| 1,943,112 | Curtis | Jan. 9, 1934 |
| 1,958,696 | Digby | May 15, 1934 |
| 2,279,124 | Mayne | Apr. 7, 1942 |
| 2,291,713 | Hefley | Aug. 4, 1942 |
| 2,647,033 | Faus | July 28, 1953 |